US011177053B2

United States Patent
Ahn et al.

(10) Patent No.: US 11,177,053 B2
(45) Date of Patent: Nov. 16, 2021

(54) HIGH-SHIELDING LIGHT-WEIGHT CABLES INCLUDING SHIELDING LAYER OF POLYMER-CARBON COMPOSITE

(71) Applicant: NEXANS, Courbevoie (FR)

(72) Inventors: Dae-Up Ahn, Chungcheongbuk-do (KR); Mi-Geon Baek, Chungcheongbuk-do (KR)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 16/703,391

(22) Filed: Dec. 4, 2019

(65) Prior Publication Data

US 2020/0219637 A1 Jul. 9, 2020

(30) Foreign Application Priority Data

Dec. 10, 2018 (KR) .................. 10-2018-0158305

(51) Int. Cl.
| | |
|---|---|
| *H01B 7/02* | (2006.01) |
| *H01B 7/18* | (2006.01) |
| *B32B 27/08* | (2006.01) |
| *H01B 7/00* | (2006.01) |
| *H01B 7/20* | (2006.01) |

(52) U.S. Cl.
CPC ........... *H01B 7/1875* (2013.01); *B32B 27/08* (2013.01); *H01B 7/0054* (2013.01); *H01B 7/20* (2013.01)

(58) Field of Classification Search
CPC ... H02B 7/02; H02B 7/04; H02B 7/06; H02B 7/08; H02B 7/1875; H02B 7/0054; H02B 7/20

USPC ..... 174/110 R–110 F, 113 R, 102 R, 102 SC, 174/120 R, 120 SR
See application file for complete search history.

(56) References Cited

U.S. PATENT DOCUMENTS

| | | | | |
|---|---|---|---|---|
| 3,098,893 | A * | 7/1963 | Pringle | ............... H01B 11/00 174/102 SC |
| 4,472,597 | A | 9/1984 | Tadayuk | |
| 5,262,592 | A * | 11/1993 | Aldissi | ............... H01B 11/146 174/106 SC |
| 8,080,734 | B2 * | 12/2011 | Mukai | ............... H01Q 9/30 174/102 R |
| 2005/0006126 | A1 * | 1/2005 | Aisenbrey | ....... G06K 19/07749 174/68.1 |

(Continued)

FOREIGN PATENT DOCUMENTS

| | | |
|---|---|---|
| CN | 208208416 | 12/2018 |
| JP | 2018152249 | 9/2018 |

(Continued)

OTHER PUBLICATIONS

EU search report dated Mar. 2, 2020.
Notification of Provisional Refusal dated Apr. 20, 2020.
CN Office Action dated Feb. 2, 2021.

*Primary Examiner* — William H. Mayo, III
(74) *Attorney, Agent, or Firm* — Sofer & Haroun, LLP

(57) ABSTRACT

A cable for power transmission or communication has a core unit having at least one conductor and an insulating layer surrounding each conductor. A first shielding layer surrounds the core unit and is formed of a polymer-carbon composite in which carbon-based particles are dispersed in a matrix of thermosetting polymer material, the first shielding layer having an electrical resistance of 10 Ω·m or less. A metal-based second shielding layer surrounds the first shielding layer.

14 Claims, 1 Drawing Sheet

(56) References Cited

U.S. PATENT DOCUMENTS

| | | | | |
|---|---|---|---|---|
| 2005/0011664 | A1* | 1/2005 | Lee | H01B 11/1066 |
| | | | | 174/102 SC |
| 2006/0254801 | A1* | 11/2006 | Stevens | H01B 11/1008 |
| | | | | 174/102 R |
| 2007/0293086 | A1* | 12/2007 | Liu | H01B 11/1808 |
| | | | | 439/578 |
| 2008/0254675 | A1* | 10/2008 | Lee | H01B 11/1808 |
| | | | | 439/578 |
| 2009/0255706 | A1* | 10/2009 | Jiang | H01B 1/24 |
| | | | | 174/102 R |
| 2010/0132973 | A1* | 6/2010 | Fitz | H01B 9/02 |
| | | | | 174/102 R |
| 2011/0232937 | A1* | 9/2011 | Montena | C09D 5/24 |
| | | | | 174/106 R |
| 2012/0000692 | A1* | 1/2012 | Tsuchiya | H01R 13/6599 |
| | | | | 174/107 |
| 2012/0247800 | A1* | 10/2012 | Shah | H05K 9/009 |
| | | | | 174/36 |
| 2013/0306348 | A1* | 11/2013 | Holzmueller | H01B 7/046 |
| | | | | 174/105 R |

FOREIGN PATENT DOCUMENTS

| | | |
|---|---|---|
| KR | 101135055 | 4/2012 |
| KR | 1020150001751 | 1/2015 |

* cited by examiner

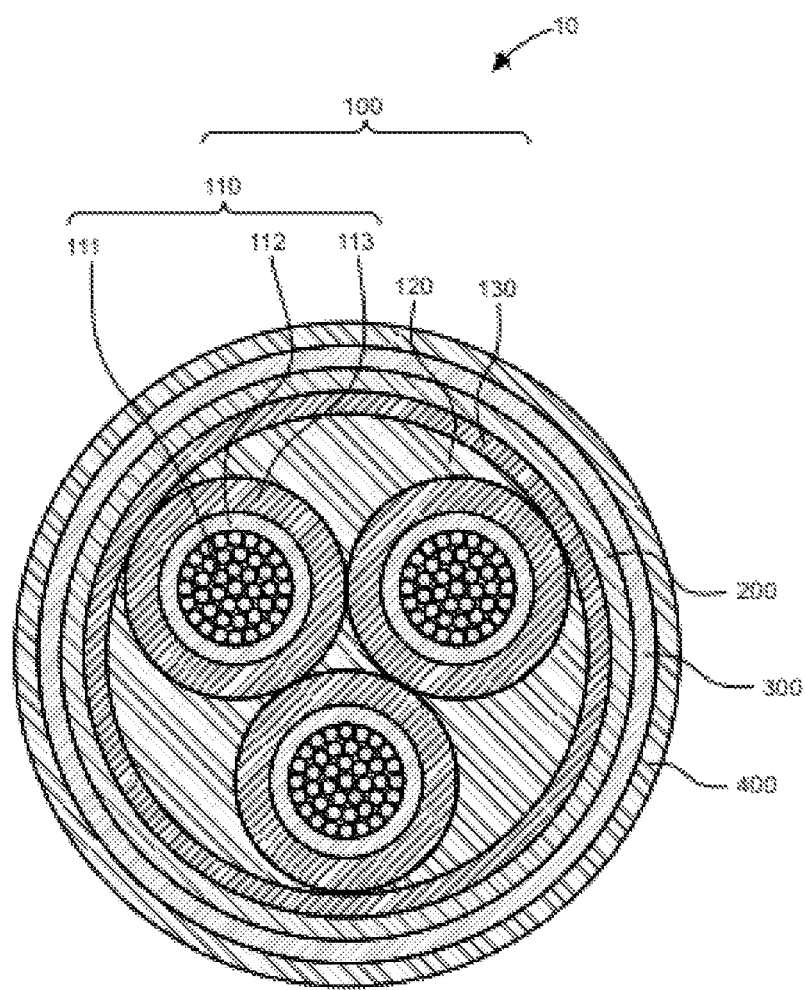

HIGH-SHIELDING LIGHT-WEIGHT CABLES INCLUDING SHIELDING LAYER OF POLYMER-CARBON COMPOSITE

RELATED APPLICATION

This application claims the benefit of priority from Korean Patent Application No. KR 10-2018-0158305, filed on Dec. 12, 2018, the entirety of which is incorporated by reference.

TECHNICAL FIELD

The present invention relates to a high shielding lightweight cable, more specifically, a cable of reduced weight and improved shielding efficiency by using a shielding layer made of a polymer-carbon composite containing carbon particles having high electrical conductivity.

BACKGROUND ART

Cables, particularly coaxial cables for transmitting power or electrical signals for communication include various components for transmission performance and protection against environmental influences. Generally, such a cable includes a conductor made of solid or stranded wires, an insulating layer made of a dielectric material for electrical insulation, and a shielding layer made of a conductive material for electromagnetic shielding.

Meanwhile, a cable increases in the size and the length as the scale of facilities using the cable increases. Particularly, transportations with a great bulk and advanced technologies such as lorries, ships, trains, aircraft and spacecraft have at least tens of kilometers to thousands of kilometers of cable. Therefore, the weight reduction of the cable can greatly contribute to the reduction of weight of vehicles and the energy saving.

Shielding layers conventionally used has been formed by winding foils or weaving tapes or braiding wires all or most of which are made of metal materials of high electrical conductivity, and so, in order to lighten the cable, there has been a demand for shielding layers of new configuration and material to replace the conventional shielding layer of heavy metal materials.

For this purpose, a shielding layer is proposed being made of a metal-polymer foil with a polymer film on which a metal foil or a metal film such as copper or aluminum. Although such a shielding layer is advantageous for reducing the weight of cable, it can only be used in a limited environment where EMI is not high because of low shielding efficiency.

In addition, a shielding layer is proposed using a copper foil with good shielding efficiency, or a copper foil and a metal foil (or a metal-polymer foil) together. However, since the shielding efficiency of the cable including such a shielding layer increases as the coverage density of copper braid increases, there is a problem that the diameter and the number of strands of the copper braid have to be increased for high shielding efficiency, and thereby the weight of cable is also increased.

On the other hand, there have been attempts to apply to cables the carbon nanostructures such as carbon fibers or carbon nanotubes that are not metals but have excellent electrical conductivity and much lighter weight. However, carbon structures of nanometer or micrometer size have to be applied to the cable in the form of aggregates, but the electrical conductivity and shielding efficiency of the carbon aggregates are far inferior to copper braid. Further, in order to obtain the shielding efficiency of the copper braiding level, additional processes such as doping or plating of metal ions on a carbon fiber is required, and these additional processes are very time and cost consuming and thereby commercial applications are largely limited. Moreover, there is a disadvantage that, in order to apply the carbon aggregates to the cable as shielding layers, new machines and processes are required in addition to the existing machines and processes.

DISCLOSURE OF INVENTION

Purpose of Invention

Therefore, in order to solve the above problems, the object of the present invention is to provide a high shielding lightweight cable using carbon materials having excellent electrical conductivity but low mass that allows to reduce the weight of a shielding layer and to achieve a high shielding efficiency, and which can be manufactured by the existing machine without extra costly processes.

Technical Solution

To accomplish the above object, the present invention provides a cable for power transmission or communication comprising: a core unit comprising at least one conductor and an insulating layer surrounding each conductor; a first shielding layer surrounding the core unit and being formed of a polymer-carbon composite in which carbon-based particles are dispersed in a matrix of a polymer material, the first shielding layer having an electrical resistance of 10 Ω·m or less; and a metal-based second shielding layer surrounding the first shielding layer.

The polymer material may have a number average molecular weight of at least 1,000 g/mol, preferably at least 10,000 g/mol, and more preferably at least 1,000,000 g/mol.

Such polymer material may be, for example, epoxy, polyester, vinyl ester, polyetherimide, polyetherketone ketone, polyphthalamide, polyetherketone, polyetheretherketone, polyimide, phenol formaldehyde, bismaleimide, Polyethylene terephthalate, polycarbonate, acrylonitrile-butadiene styrene copolymer, or other thermosetting materials.

In addition, the carbon-based particles may comprise particles having excellent electrical conductivity. The carbon-based particles may be selected among particles of graphite, graphene, graphene oxide, carbon nanotube (CNT), carbon fiber, carbon black, and any mixture thereof. More preferably, the carbon-based particles can be in a form of powder. That is, the carbon-based particles may be composed of one type of carbon material, or a mixture of two or more carbon materials having different structures and shapes, or may include carbon materials having additional treatment in order to improve the electrical conductivity or a degree of mixing with the polymer material.

The polymer-carbon composite can be formed by mechanically mixing the polymer material and the carbon-based particles at a temperature higher than the processing temperature of the polymer material, so that carbon-based particles dispersed in a matrix of polymer material can be obtained. Here, the processing temperature of the polymer material means a temperature to physically modify the shape of polymer by mixing, extruding, etc. without degradation of the polymer. For example, said temperature can be of at least 40° C., more preferably to at least 60° C., and even more preferably to at least 70° C. The electrical resistance of the first shielding layer can be measured through a low resistivity tester well-known in the art, and the electrical resistance of the first shielding layer formed of the polymer-carbon composite is 10 Ω·m or less, preferably 1 Ω·m or less. As such, the polymer-carbon composite according to the present invention has excellent electrical conductivity that can provide a high shielding efficiency.

In the present invention, the electrical resistance can be measured at ambient temperature (20° C.)

In the present invention, the first shielding layer formed of the polymer-carbon composite can be formed by applying uniformly on the core unit by a conventional melt extrusion process. That is, the first shielding layer can be formed by extruding the polymer-carbon composite on the core unit along the longitudinal direction of the cable. Hence, the first shielding layer is preferably an extruded layer. This is one of the main advantages provided by the present invention. According to the present invention, the machines used in the conventional extrusion process for forming an insulation film or a cover of a cable can be used in the process of forming a shielding layer of polymer-carbon composite as it is, and thus a continuous process can be designed including the formation of the shielding layer of polymer-carbon composite on a cable manufacturing line.

In case of a multi-core cable having a core unit with a plurality of conductors, the core unit can further comprise filler that assembles the plurality of conductors and fills space among the conductors for a circular cross-section, and the first shielding layer can be formed by melt-extruding the polymer-carbon composite on the filler.

In addition, around the filler of the multi-core cable, a bedding layer for fixing the core-filler structure and shape, or an inner sheath layer for protecting the cable from external impact or corrosion may be further arranged, and the first shielding layer can be formed by extruding the polymer-carbon composite on the bedding layer or the inner sheath layer.

However, the first shielding layer formed of the polymer-carbon composite may be extruded to serve as filler that fills the space among the cores and maintains the shape of the core unit. In this case, separate filler may be omitted, and the first shielding layer functions as filler in addition to a shield.

Alternatively, the first shielding layer formed of the polymer-carbon composite may be extruded around the filler to serve as a bedding layer for fixing the core-filler structure, and thus the bedding layer may be omitted, or the first shielding layer may function the protection of the cable from external impact or corrosion instead of the inner sheath layer, so the inner sheath layer may also be omitted if special conditions are not required for the cable in a specific environment.

That is to say, the first shielding layer formed of the polymer-carbon composite according to the present invention can serve as filler, a bedding layer, or an inner sheath layer in addition to a shield with high efficiency, and thus the cable can be lightened by omitting separate filler, a bedding layer, or a inner sheath layer and the like.

In the polymer-carbon composites, the ratio of the content of the carbon-based particles to the polymeric material can be determined such that the first shielding layer satisfies a predetermined electrical resistivity, or the cable satisfies a predetermined shielding efficiency.

For example, in order to achieve excellent electrical conductivity of the first shielding layer and melt process-ability for the extrusion process, the content of carbon-based particles may be 5 parts by weight or more, preferably 10 parts by weight or more, based on 100 parts by weight of the polymeric material. The content of carbon-based particles may be 100 parts by weight or less, preferably 50 parts by weight or less, based on 100 parts by weight of the polymeric material.

Moreover, the thickness of the first shielding layer can also be determined so as to satisfy a predetermined electrical resistance or a predetermined shielding efficiency.

For example, in order to achieve excellent shielding efficiency and light weight of the cable, the first shielding layer may be formed to a thickness of 0.1 mm to 5 mm, preferably 0.5 mm to 2 mm. However, the thickness of the first shielding layer may exceed 5 mm when a higher shielding efficiency is required even if the weight of the cable increases.

Furthermore, the polymer-carbon composite may be crosslinked to improve the mechanical and physical durability, heat resistance, oil resistance, etc. of the first shielding layer. For this purpose, the polymer-carbon composite may contain a crosslinking agent and/or a crosslinking co-agent. A suitable cross-linking agent and a cross-linking co-agent can be selected for the cross-linking conditions and mixed together with the polymer material and the carbon-based particle by means of an ordinary mixer such as an internal mixer or a roll-mill mixer. Then, after the first shielding layer is applied on the core unit through melt extrusion process described above, it may be crosslinked through a cross-linking process such as heating or irradiating ultraviolet light.

The second shielding layer can be formed by taping a metal foil or a metal-polymer foil, or by braiding a plurality of metal strands or strand bundles of strands. The type of metal constituting the second shielding layer is a metal having good electrical conductivity such as copper or aluminum.

When the second shielding layer is formed of a strip-shaped metal foil, it may be made by a helicoidal or longitudinal taping process. In addition, when the second shielding layer is formed of a plurality of metal strands, it may be made by a braiding process. In this case, the surface density of the metal braided shielding layer can be determined such that the cable satisfies a predetermined shielding efficiency.

In a preferred embodiment, one or more third shielding layers formed of a polymer-carbon composite may be added to the radially inside or outside of the second shielding layer. This third shielding layer can further improve the overall shielding efficiency of the cable without increasing the second shielding layer made of metal material.

Advantageous Effects

The cable according to the present invention provides the advantages to reduce the weight while maintaining high shielding efficiency by using a shielding layer composed of polymer-carbon composite having very low electrical resistance or high electrical conductivity relative to the conventional cable with a shielding layer composed of only metal material. Thereby, the cable according to the present invention can reduce the weight of vehicle body and increase the fuel efficiency when installed in ships, vehicles, automobiles, aircraft, etc. for power supply or communication of electronic devices.

In addition, since the carbon particles of micro size are applied in the form of polymer-carbon composite in the cable according to the present invention, those can be manufactured using the existing extruder, and thus it is advantageous that the application can be added easily to the manufacturing line without new machines or processes. Furthermore, the cable according to the present invention can achieve the desired shielding efficiency and the lightening of the cable depending on the installation purpose or environment by adjusting the composition ratio of polymer-carbon composite, the thickness of shielding layer and/or the number of shielding layers.

BRIEF DESCRIPTION OF THE DRAWINGS

FIG. 1 shows a cross-sectional view of a cable according to one embodiment of the present invention.

BEST MODE FOR CARRYING OUT THE INVENTION

Hereinafter, the present invention will be described in more detail with reference to the accompanying drawing.

FIG. 1 is a cross-sectional view of a cable according to one embodiment of the present invention. As illustrated, a cable 10 according to the present invention includes a core unit 100, a first shielding layer 200, a second shielding layer 300, and an outer sheath 400. However, the components of the cable 10 in FIG. 1 are illustrative and not limited, and may further include well known cable configurations such as a lead sheath layer, a semiconductive layer, an insulating layer, and a binder tape, whereas in some cases some of the components may be omitted.

The cable 10 shown in FIG. 1 is a multi-core cable including three cores through which electromagnetic wave signal is propagated. That is, the core unit 100 includes three cores 110, and each of the cores 110 includes a conductor 111, a conductor outer layer 112 surrounding the conductor, and an insulating layer 113.

The conductor 111 is made of a metal having high electrical conductivity such as copper, aluminum, aluminum alloy, or copper coated aluminum. The conductor 111 may be a solid conductor which is a single body or a stranded conductor which is an assembly of a plurality of thin strands.

The conductor outer layer 112 surrounding the conductor 111 is formed by a tape such as a separating tape, a fire resistive tape, a conductive tape or the like which provides a proper function according to the use and environment of the cable 10 through the helicoidal or longitudinal taping process. The conductor outer layer 112 may be a semiconductive layer which is formed on the outer surface of the conductor 111 through a melt extrusion process of a polymer composite containing a conductive component such as carbon black and which functions to uniformly distribute the electric field of the stranded conductor and to mitigate the partial discharge and the concentration of local electric stress at the interface between the conductor and the insulating layer. The conductor outer layer 112 is optional and may be omitted.

The insulating layer 113 surrounding the conductor outer layer 112 may be formed by melt extrusion of the dielectric onto the outer surface of the conductor outer layer 112. For example, if a fire resistive tape is helicoidal taped on the conductor 111, the insulating layer 113 may be formed by melt extruding the dielectric along longitudinal direction to uniformly wrap the fire resistive tape layer.

The conductor 111, the conductor outer layer 112 and the insulating layer 113 constitute one core 110 and the three cores 110 form a core assembly twisted each other by a constant pitch.

On the outside of the core assembly, filler 120 is disposed to assemble the cores and to fill the gap for circular cross section. The filler 120 can be made of polyester, polypropylene (PP), polyvinyl chloride (PVC), ethylene propylene diene monomer (EPDM), ester yarns, amide yarns, polyester yarns, aramid yarns, etc. The material for the filler 120 may be selected from a various thermosetting or thermoplastic polymers having physical and chemical properties such as tensile strength, moisture resistance, and flame resistance depending on the usage or the installation environment of the cable 10. A bedding layer 130 is disposed around the filler 120 to maintain the core-filler structure and shape, and it may be made of PVC, PE, polyolefin, or the like.

As described above, in this embodiment, the core assembly of the three cores 110, the filler 120, and the bedding layer 130 around them constitute a core unit 100. However, the configuration of the core unit is not limited to this, and may be composed of only a single core, or an assembly of two or four or more cores, and the filler 120 and the bedding layer 130 may be omitted depending on the installation environment of the cable.

According to the present invention, a first shielding layer 200 formed of polymer-carbon composite is disposed around the core unit 100, and a second shielding layer 300 based on metal is disposed around the first shielding layer 200.

The polymer-carbon composite constituting the first shielding layer 200 is formed by mechanically mixing the polymer material and the carbon-based particles at a temperature higher than a processing temperature of the polymer material. The polymer material may have a number average molecular weight of at least 1,000 g/mol, preferably at least 10,000 g/mol, or more preferably at least 1,000,000 g/mol. Such polymer materials may be, for example, epoxy, polyester, vinyl ester, polyetherimide, polyetherketone ketone, polyphthalamide, polyetherketone, polyetheretherketone, polyimide, phenol formaldehyde, bismaleimide, Polyethylene terephthalate, polycarbonate, acrylonitrile-butadiene styrene copolymer, or other thermosetting materials.

The carbon-based particles are formed of at least one of powders of graphite, graphene, graphene oxide, carbon nanotubes, carbon fibers, and carbon black. That is, the carbon-based particles may be composed of one type of carbon material, or a mixture of two or more carbon materials having different structures and shapes, or may include carbon materials having additional treatment in order to improve the electric conductivity or a degree of mixing with the polymer material.

Particularly, the first shielding layer 200 is formed to have an electrical resistance of 10 Ω·m or less which can be measured by a low resistivity tester. The first shielding layer 200 can be formed to have an electrical resistance of 10 Ω·m or less, and more preferably 1 Ω·m or less by being composed of the polymer-carbon composite. Thus, the cable according to the present invention can achieve high shielding and light weight by using the shielding layer formed of polymer-carbon composite that is capable of reducing weight while providing high shielding efficiency.

The first shielding layer 200 is formed by extruding the polymer-carbon composite on the core unit 100 along the longitudinal direction of the cable by a conventional melt extrusion process. That is, the polymer-carbon composite constituting the first shielding layer of the present invention can be disposed on the core unit 100 using the machine used in the conventional cable manufacturing process, and no new extra machine or process is required.

In this embodiment, since the core unit 100 includes the filler 120 and the bedding layer 130 around the core assembly, the first shielding layer 200 is formed by extruding the polymer-carbon composite onto the bedding layer 130. However, since the polymer-carbon composite itself can serve as filler that fills the gaps of the core assembly to have a circular cross-section, and also as a bedding layer to maintain the core-filler structure, in other embodiments, the bedding layer, or both of the filler and the bedding layer may be omitted, and those can be substituted by the first shielding layer 200 of polymer-carbon composite.

Although not shown in the FIGURE, an inner sheath layer for protecting the cable from external impact or corrosion may be added around the core unit 100. However, the polymer-carbon composite itself can also serve as the inner sheath layer, and thus the first shielding layer formed of the polymer-carbon composite can be configured to substitute the inner sheath layer.

That is to say, the first shielding layer 200 formed of polymer-carbon composite according to the present invention can serve as filler, a bedding layer, or an inner sheath layer in addition to a shield with high efficiency and low weight, and therefore the filler, the bedding layer, and/or the inner sheath layer can be omitted so that the cable can be further lightened.

In order to provide excellent electrical conductivity as described above and to secure melt processability in a conventional extrusion process, the polymer-carbon composite material of the first shielding layer 200 may have 5 parts by weight or more of the carbon-based particles, preferably 10 parts by weight or more, and 100 parts by weight or less, preferably 50 parts by weight or less relative to 100 parts by weight of the polymeric material. Particularly, the ratio of the content of the carbon-based particles to the polymer material in the polymer-carbon composite is determined so that the first shielding layer satisfies a predetermined electrical resistance or the cable satisfies a predetermined shielding efficiency.

Moreover, the thickness of the first shielding layer 200 is determined so as to satisfy a predetermined electrical resistivity or a predetermined shielding efficiency, and it can be 0.1 mm to 5 mm, preferably 0.5 mm to 2 mm for excellent shielding efficiency and light weight. However, the thickness of the first shielding layer may exceed 5 mm when a higher shielding efficiency is required even if the weight of the cable increases. The thickness of the first shielding layer is defined as the shortest distance between the upper layer and the lower layer adjacent to the first shielding layer, and thus, in this embodiment, since the first shielding layer 200 is adjacent to the bedding layer 130 of the core unit and the second shielding layer 300, the thickness of the first shielding layer is the shortest distance between the outer surface of the bedding layer 130 and the inner surface of the second shielding layer 300. In another embodiment where the bedding layer 130 and the filler 120 of the core unit are omitted, the first shielding layer 200 is adjacent with the insulating layer 113 of the cores, so the thickness of the first shielding layer would be the shortest distance between the outer surface of the insulating layers 113 of the cores and the inner surface of the second shielding layer 300.

The polymer-carbon composite may be crosslinked to improve the mechanical and physical durability, the heat resistance, or the oil resistance, etc. of the first shielding layer 200. For this purpose, a crosslinking agent and/or a crosslinking co-agent can be added to the polymer-carbon composite. The crosslinking agent and the crosslinking co-agent can be mixed by a normal mixer such as an internal mixer or a roll-mill mixer, and after the polymer-carbon composite is applied on the core unit through a melt extrusion process, it may be crosslinked through a cross-linking process such as further heating or irradiating ultraviolet light.

The second shielding layer 300 can be formed by taping a metal foil or a metal-polymer foil, or by braiding a plurality of metal strands or bundles of strands. The type of metal constituting the second shielding layer 300 is a metal having excellent electrical conductivity such as copper or aluminum.

When the second shielding layer 300 is formed of a strip-shaped metal, it may be made by a helicoidal or longitudinal taping process. In addition, when the second shielding layer 300 is formed of a plurality of metal strands, it may be made by a braiding process, and the metal strand (or wire) is copper wire, tin-coated copper wire, aluminum wire, aluminum alloy wire, copper coated aluminum wire, and metal composite wire in which copper, aluminum or nickel is plated on a polymer or carbon fiber. The surface density of the metal braided shielding layer is determined so that the cable satisfies a predetermined shielding efficiency.

Around the second shielding layer 300 in this embodiment, an outer sheath 400 formed of a material suitable for the usage or installation environment of the cable 10 is disposed.

However, in another embodiment not shown, one or more third shielding layers formed of the polymer-carbon composite such as a first shielding layer may be added around the second shielding layer 300, or between the first shielding layer and the inner side of the second shielding layer, as needed. Such a third shielding layer can contribute to improve the total shielding efficiency of a cable as required, without increasing the thickness of the second shielding layer of metal material.

Examples

The following is a compared test result of the shielding efficiency and the weight of a cable according to the present invention and a conventional cable.

In order for the compared test, the core unit of the cables according to the present invention and the cable according to the prior art were prepared in the same way as follows:

Copper stranded assembly for conductors were prepared by winding 47 strands of tin-coated copper wire with 0.255±0.005 mm diameter to right with a pitch of 99.0 mm according to IEC 60228 (class 2). On the copper stranded assembly, two types of fire resistance tapes with different widths were wound to form a conductor outer layer composed of two layers. In particular, one fire resistance tape of a width of 10 mm and a thickness of 0.130 mm (mica-glass tape, SR854G) was helicoidal taped onto the copper stranded assembly with an allowable overlapping rate of 45±5%, and another fire resistance tape with a width of 15 mm and a thickness of 0.130 mm was helicoidal taped onto the first fire resistance tape with an allowable overlapping rate of 45±5%. On the fire resistance tape layer, an insulating layer of the copper stranded assembly taped with the fire resistance tapes was formed by melt extruding an insulation compound (E-80, KUKDONG ELECTRIC WIRE CO., LTD) based on an ethylene-propylene copolymer according to IEC 60092-351 (HF-HEPR) to a thickness of 0.900±0.100 mm, and then crosslinked in a catenary continuous vulcanization line (CCV line) under high pressure and high temperature. As such, three cores with the copper stranded assembly wound by the fire resistance tapes and covered by the insulating layer were prepared, and those were assembled by twisting to the right at a pitch interval of 171.0 mm. In the gaps among the cores, three binder fillers (13500 denier, Sungwon Industries) prepared by collecting amide fibers in a binder form were arranged for a width of 55 mm, and assembled together with the three cores.

Meanwhile, the polymer-carbon composite for the cable according to the present invention was prepared as NBR-CNT composite (K-Nanos-INB141, Kumho Petrochemical) which is a mixture of a nitrile rubber (NBR) as a matrix with 20 parts by weight of CNT based on 100 parts by weight of NBR. Then, the electrical resistance of said NBR-CNT composite was measured at ambient temperature (20° C.) with a low resistivity tester, and the result was 1 Ω·cm.

In order for cross-linking, the NBR-CNT composite was added by 1 part by weight of bis (t-butylperoxyisopropyl) benzene (Perbutyl P, NOF Corporation) as a hydrogen peroxide cross-linking agent relative to 100 parts by weight of the NBR-CNT composite, and mixed by a roll-mill mixer for 5 minutes at a roll temperature of 80° C. (i.e. processing temperature).

The NBR-CNT composite with the cross-linking agent was prepared in a form of long ribbon for continuous injection, and extruded on the core unit of core-filler to a thickness of 1 mm to form a first shielding layer. After the extrusion process, it was crosslinked in CCV line under high temperature and high pressure.

Around the first shielding layer, a second shielding layer was provided by metal-braiding. In order to prevent damages of the shielding layer of the NBR-CNT composite, firstly a PET tape of a thickness of 0.05 mm and a width of 50 mm was helicoidally taped, and the metal-braiding was applied on the PET tape layer. For the metal-braiding, a copper braid was used which was made by twisting 16 sets of copper wires each set of which consists of N strands of tin-coated copper with a diameter of 0.3 mm at a braiding angle of 36.17° and a pitch of 55 mm. Here, Examples 1 to 4 were prepared with N of 9, 6, 4, or 2. That is, each cable of Examples 1 to 4 have different surface densities of the copper braids having 9, 6, 4, or 2 strands of copper.

The surface density of the copper braid can be obtained from the following formula given in IEC 60092-350:2014:

$$G = \frac{\pi}{2} \cdot F \cdot 100 \quad \text{[Formula 1]}$$

$$F = \frac{NPd}{\sin\alpha}$$

Where G is the surface density, F is the filling factor, a is the braiding angle, i.e. the angle between the cable axis and the copper wire, d is the diameter of the copper wire, N is the number of the copper wires constituting the set of the copper wires (carrier), and P is the number of picks per mm.

Therefore, the surface densities of the copper braids of Examples 1 to 4 were 104% (Example 1, SC104), 69% (Example 2, SC69), 46% (Example 3, SC46) and 23% (Example 4, SC23), respectively.

Additionally, Example 5 was prepared to have the same surface density of the copper braids (SC46) as that of Example 3, but to replace the fillers of amide fibers with the NBR-CNT composite. In this Example, three cores were assembled without binder fillers, and the shielding layer of NBR-CNT composite was extruded on the cores to fill gaps among the cores to have a thickness of 1 mm on top of it.

On the other hand, the cable according to the prior art (comparative example; Control) was extruded on a conventional SHF2-type bedding layer (XLPO-5, KUKDONG ELECTRIC WIRE CO., LTD) around the filler of the core unit, and crosslinked in CCV line under high temperature and high pressure after the extrusion process.

Around the bedding layer, a conventional shielding layer was provided by metal-braiding. In order to prevent damages of the bedding layer, firstly a PET tape of a thickness of 0.05 mm and a width of 50 mm was helicoidally taped as the above Examples 1-4, and the metal-braiding was applied on the PET tape layer. For the metal-braiding, a copper braid was used which was made by twisting 16 sets of copper wires each set of which consists of 9 strands of tin-coated copper with a diameter of 0.3 mm at a braiding angle of 36.17° and a pitch of 55 mm. Therefore, the surface density of the copper braid of the cable of the comparative example was 104% as in Example 1.

For the cables of Examples 1 to 5 and Comparative Example (Control), the shielding efficiencies were measured at frequencies in the range of 300 kHz to 1 GHz by measuring the transfer impedance and the screening attenuation according to IEC 62153-4-3:2013 and IEC 62153-4-4:2015 standards through triaxial method by CoMeT 90 system of Guidant Corp. The weights of the cables were determined by preparing 5 m of each cables and averaging the weight of five samples each cut in 1 m.

The result of measurements of the shielding efficiencies and weights of the cables of Examples 1 to 5 as well as Comparative Example were shown in the following table:

TABLE 1

| Cable | Shielding Efficiency (dB) | | | | | Weight (g/m) |
| | 300 kHz | 3 MHz | 30 MHz | 300 MHz | 1 GHz | Reduction ratio (%) |
|---|---|---|---|---|---|---|
| Comparative Example (Control) | 85 | 66 | 53 | 44 | 55 | 300 |
| Example 1 (SC104) | 85 | 67 | 55 | 56 | 57 | 280 (6.7%) |
| Example 2 (SC69) | 76 | 58 | 45 | 47 | 54 | 255 (15%) |
| Example 3 (SC46) | 71 | 52 | 38 | 41 | 52 | 235 (22%) |
| Example 4 (SC23) | 68 | 48 | 33 | 37 | 47 | 220 (27%) |
| Example 5 (SC46) | 82 | 57 | 44 | 46 | 58 | 225 (15%) |

As can be seen from Table 1, when a nonconductive SHF2 bedding layer of the conventional cable (Comparative Example) with the same surface density of 104% of the copper braided shielding layer was replaced by the NBR-CNT composite shielding layer (Example 1), the shielding efficiency was improved in all the frequency ranges. In particular, it is note that the shielding efficiency of Example 1 was improved by about 27% compared to the Comparative Example at 300 MHz. This means that the cable of Example 1 (SC104) including the NBR-CNT composite shielding layer according to the present invention has high shielding performance that can be used in an environment of severe electromagnetic interference (EMI). Moreover, the cable of Example 1 (SC104) according to the present invention showed a weight reduction of about 6.7% per unit meter compared to the Comparative Example. This is because the specific gravity of the NBR-CNT composite used in the cable according to the present invention is 1.12 which is lower than the specific gravity of 1.20 of the SHF2 bedding layer of the conventional cable.

In addition, considering that the shielding efficiency required for general signal/control cables is 40 dB or more, the cable of Example 2 (SC69) with the reduced surface density of the copper braid shielding layer by 69% as well as the NBR-CNT composite shielding layer according to the present invention showed a shielding efficiency of more than 40 dB in all of the measured frequency ranges, and thus can be used sufficiently as a lightweight cable.

The cables of Example 3 (SC46) and Example 4 (SC23) according to the present invention were reduced in weights by 22% and 27% respectively by using the NBR-CNT composite shielding layer as well as the copper braided shielding layer with greatly reduced surface densities by 46% and 23%. Although the cables showed the shielding efficiencies less than 40 dB in some frequency ranges, those could be used in other frequency ranges where the shielding efficiency is more than 40 dB, or in an environment where electromagnetic interference is not severe as a lightweight cable.

Furthermore, even if the surface density of the copper braid shielding layer is significantly reduced as in the cables of Examples 3 and 4, Example 5 shows the shielding efficiency more than 40 dB in all the frequency ranges by making the NBR-CNT composite shielding layer thicker and omitting the filler in the core unit. In addition, it would also be possible to pull up the shielding efficiency to more than 40 dB by increasing the content of CNT particles in the NBR-CNT composite, or by further adding a NBR-CNT composite shielding layer on the copper braided shielding layer.

While the present invention has been described with reference to the limited embodiments and FIGURES, it is not to be restricted by the embodiments, and those skilled in the art may implement various changes or modifications from the description. The spirits of the present invention should be grasped only by the claims described below, and all the equal or equivalent modifications of the claims are intended to fall within the scopes of the invention.

DESCRIPTION OF REFERENCES

| | | | |
|---|---|---|---|
| 10: | Cable | 100: | Core unit |
| 110: | Core | 111: | Conductor |
| 112: | Conductor outer layer | 113: | Insulating layer |
| 120: | Filler | 130: | Bedding layer |
| 200: | First shielding layer | 300: | Second shielding layer |
| 400: | Outer sheath | | |

The invention claimed is:

1. A cable for power transmission or communication comprising:
   a core unit having at least one conductor and an insulating layer surrounding each conductor;
   a first shielding layer surrounding the core unit and being formed of a polymer-carbon composite in which carbon-based particles are dispersed in a matrix of thermosetting polymer material, the first shielding layer having an electrical resistance of 10 Ω·m or less, and wherein the first shielding layer has a thickness of 0.1-5 mm; and
   a metal-based second shielding layer surrounding the first shielding layer.

2. The cable according to claim 1, wherein the thermosetting polymer material has a number average molecular weight of at least 1,000 g/mol.

3. The cable according to claim 1, wherein the carbon-based particles comprise at least particles selected among particles of graphite, graphene, graphene oxide, carbon nanotubes, carbon fibers, carbon black, and any mixture thereof.

4. The cable according to claim 1, wherein the polymer-carbon composite is formed by mechanically mixing the thermosetting polymer material and the carbon-based particles at a temperature higher than a processing temperature of the polymer material.

5. The cable according to claim 4, wherein the ratio of the content of the carbon-based particles to the thermosetting polymeric material in the polymer-carbon composite, or the thickness of the first shielding layer is determined such that the first shielding layer satisfies a predetermined electrical resistivity, or the cable satisfies a predetermined shielding efficiency.

6. The cable according to claim 4, wherein the content of the carbon-based particles are 5 parts by weight or more and 100 parts by weight or less based on 100 parts by weight of the thermosetting polymeric material.

7. The cable according to claim 1, wherein the first shielding layer is formed by melt extrusion of the polymer-carbon composite along the longitudinal direction of the cable on the core unit.

8. The cable according to claim 7, wherein the core unit includes a plurality of conductors, and filler that assembles the plurality of conductors and fills space among the conductors for a circular cross-section,
   wherein the first shielding layer is formed by melt-extruding the polymer-carbon composite on the filler.

9. The cable according to claim 7, wherein the polymer-carbon composite of the first shielding layer serves as filler, a bedding layer or an inner sheath layer around the core unit.

10. The cable according to claim 1, the polymer-carbon composite can be crosslinked with a cross-linking agent and/or a crosslinking co-agent.

11. The cable according to claim 1, wherein the second shielding layer is formed by taping a metal foil or a metal-polymer foil or braiding a plurality of strands of metal strands.

12. The cable according to claim 11, wherein the second shielding layer is formed by braiding a plurality of metal strands,
   wherein the surface density of the metal braid is determined such that the cable satisfies a predetermined shielding efficiency.

13. The cable according to claim 1, further comprising at least one third shielding layer formed of the polymer-carbon composite inside or outside of the second shielding layer in the radial direction.

14. A cable for power transmission or communication comprising:
   a core unit having at least one conductor and an insulating layer surrounding each conductor;
   a first shielding layer surrounding the core unit and being formed of a polymer-carbon composite in which carbon-based particles are dispersed in a matrix of thermosetting polymer material, the first shielding layer having an electrical resistance of 10 Ω·m or less, and wherein the first shielding layer has a thickness equal to or less than 2 mm; and
   a metal-based second shielding layer surrounding the first shielding layer.

* * * * *